United States Patent
Luk-Zilberman et al.

(10) Patent No.: US 12,470,593 B2
(45) Date of Patent: Nov. 11, 2025

(54) MALICIOUS LATERAL MOVEMENT DETECTION USING REMOTE SYSTEM PROTOCOLS

(71) Applicant: Armis Security Ltd., Tel Aviv-Jaffa (IL)

(72) Inventors: Evgeny Luk-Zilberman, Herzliya (IL); Gil Ben Zvi, Hod Hasharon (IL); Ron Shoham, Tel Aviv (IL); Yuval Friedlander, Petah-Tiqwa (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 114 days.

(21) Appl. No.: 17/811,699

(22) Filed: Jul. 11, 2022

(65) Prior Publication Data

US 2024/0015177 A1    Jan. 11, 2024

(51) Int. Cl.
*H04L 9/40* (2022.01)

(52) U.S. Cl.
CPC ........ *H04L 63/145* (2013.01); *H04L 63/1416* (2013.01)

(58) Field of Classification Search
CPC . H04L 63/102; H04L 63/145; H04L 63/0227; H04L 63/0236; H04L 63/0876;
(Continued)

(56) References Cited

U.S. PATENT DOCUMENTS

| 1,145,501 A | 7/1915 | More et al. |
| 5,471,459 A | 11/1995 | Gut |

(Continued)

FOREIGN PATENT DOCUMENTS

| CA | 2326194 A1 | 8/2001 |
| CN | 102833271 A | 12/2012 |

(Continued)

OTHER PUBLICATIONS

International Search Report and Written Opinion for Application No. PCT/IB2023/057105 dated Nov. 5, 2023, ISA/Israel Patent Office, 10 pages.

(Continued)

*Primary Examiner* — James N Fiorillo
(74) *Attorney, Agent, or Firm* — Perkins Coie LLP

(57) ABSTRACT

A system and method for malicious lateral movement detection. A method includes identifying atomic tunnels in packets sent between devices; identifying tunnel constructs; determining a potentially malicious atomic tunnel among the atomic tunnels by comparing edges of each of the atomic tunnels to edges of previously observed tunnel constructs; determining a potentially malicious tunnel including the potentially malicious atomic tunnel; and mitigating the potentially malicious tunnel. Each atomic tunnel is a structure representing communications among the devices defined with respect to at least three nodes and at least two edges. Each node represents a respective device, and each edge represents a connection between two of the devices. Each atomic tunnel has two hops, where each hop is a level of communication in which a packet is sent from one device to another device. Each tunnel construct is a structure including at least one of the atomic tunnels.

19 Claims, 6 Drawing Sheets

(58) Field of Classification Search
CPC .......... H04L 63/1416; H04L 63/1425; H04L 63/1441; H04L 63/1511; H04L 63/3025; H04L 9/16; H04L 9/40; H04L 9/0861; H04L 69/22; H04L 47/19; H04L 47/24
USPC ........................................................ 726/22
See application file for complete search history.

(56) References Cited

U.S. PATENT DOCUMENTS

| | | | |
|---|---|---|---|
| 6,363,489 B1 | 3/2002 | Comay et al. | |
| 6,754,321 B1 | 6/2004 | Innes et al. | |
| 7,165,240 B2 | 1/2007 | Patterson | |
| 7,346,338 B1 | 3/2008 | Calhoun et al. | |
| 7,499,998 B2 | 3/2009 | Toebes et al. | |
| 7,508,769 B1 | 3/2009 | Duffield et al. | |
| 7,512,980 B2 | 3/2009 | Copeland et al. | |
| 7,603,710 B2 | 10/2009 | Harvey et al. | |
| 7,792,989 B2 | 9/2010 | Toebes et al. | |
| 7,836,079 B2 | 11/2010 | Kumar et al. | |
| 7,853,250 B2 | 12/2010 | Harvey et al. | |
| 7,921,462 B2 | 4/2011 | Rooney et al. | |
| 8,209,740 B1 | 6/2012 | Kulaga et al. | |
| 8,254,286 B2 | 8/2012 | Nechushtan et al. | |
| 8,307,430 B1 | 11/2012 | Chen et al. | |
| 8,392,496 B2 | 3/2013 | Linden et al. | |
| 8,434,148 B2* | 4/2013 | Teo | H04L 63/1441 713/168 |
| 8,468,244 B2 | 6/2013 | Redlich et al. | |
| 8,468,606 B2 | 6/2013 | Van et al. | |
| 8,504,818 B2* | 8/2013 | Rao | H04L 63/08 709/225 |
| 8,621,618 B1 | 12/2013 | Ramsey et al. | |
| 8,639,800 B2 | 1/2014 | Friedrich et al. | |
| 8,677,474 B2* | 3/2014 | Bostrom | H04L 61/2517 726/13 |
| 8,732,732 B2 | 5/2014 | Meijer et al. | |
| 8,767,630 B1 | 7/2014 | Collins et al. | |
| 8,836,536 B2 | 9/2014 | Marwah et al. | |
| 8,875,255 B1 | 10/2014 | Dotan et al. | |
| 8,972,539 B2 | 3/2015 | Carriere | |
| 9,027,079 B2 | 5/2015 | Comay et al. | |
| 9,031,087 B2 | 5/2015 | Petrovykh | |
| 9,106,714 B2 | 8/2015 | Kumarasamy et al. | |
| 9,135,293 B1 | 9/2015 | Kienzle et al. | |
| 9,149,199 B2 | 10/2015 | Farazi | |
| 9,154,516 B1 | 10/2015 | Vaystikh et al. | |
| 9,154,982 B2 | 10/2015 | Chan et al. | |
| 9,166,999 B1 | 10/2015 | Kulkarni et al. | |
| 9,231,918 B2* | 1/2016 | Khan | H04L 63/16 |
| 9,306,965 B1 | 4/2016 | Grossman et al. | |
| 9,412,024 B2 | 8/2016 | Chaudhury et al. | |
| 9,456,343 B1 | 9/2016 | Mihalache et al. | |
| 9,503,463 B2 | 11/2016 | Karta et al. | |
| 9,600,320 B2 | 3/2017 | Hamilton et al. | |
| 9,635,049 B1 | 4/2017 | Oprea et al. | |
| 9,692,775 B2 | 6/2017 | Zhang | |
| 9,749,349 B1 | 8/2017 | Czarny et al. | |
| 9,749,357 B2 | 8/2017 | Bailey et al. | |
| 9,754,112 B1 | 9/2017 | Moritz et al. | |
| 9,756,067 B2 | 9/2017 | Boyadjiev et al. | |
| 9,756,403 B2 | 9/2017 | Proud | |
| 9,894,093 B2 | 2/2018 | Maestas | |
| 9,978,038 B2 | 5/2018 | Dhandapani et al. | |
| 10,015,185 B1 | 7/2018 | Kolman et al. | |
| 10,045,218 B1 | 8/2018 | Stapleton et al. | |
| 10,063,434 B1 | 8/2018 | Khanal et al. | |
| 10,091,312 B1 | 10/2018 | Khanwalkar et al. | |
| 10,095,866 B2 | 10/2018 | Gong et al. | |
| 10,104,101 B1 | 10/2018 | Thakar et al. | |
| 10,187,369 B2 | 1/2019 | Caldera et al. | |
| 10,187,401 B2 | 1/2019 | Machlica et al. | |
| 10,291,635 B2 | 5/2019 | Muddu et al. | |
| 10,313,383 B2 | 6/2019 | Sommer | |
| 10,318,886 B2 | 6/2019 | Baradaran et al. | |
| 10,320,619 B2 | 6/2019 | Seddigh et al. | |
| 10,333,965 B2 | 6/2019 | Gathala et al. | |
| 10,333,988 B2 | 6/2019 | Porras et al. | |
| 10,380,348 B2 | 8/2019 | Cheng et al. | |
| 10,395,262 B2 | 8/2019 | Faith et al. | |
| 10,419,418 B2 | 9/2019 | Grajek et al. | |
| 10,419,931 B1 | 9/2019 | Sohail et al. | |
| 10,498,755 B2 | 12/2019 | Harris et al. | |
| 10,498,758 B1 | 12/2019 | Schwartz et al. | |
| 10,505,967 B1 | 12/2019 | Schwartz et al. | |
| 10,511,620 B2 | 12/2019 | Schwartz et al. | |
| 10,567,243 B2 | 2/2020 | Tippenhauer et al. | |
| 10,594,732 B2 | 3/2020 | Amit et al. | |
| 10,623,289 B1 | 4/2020 | Mccorkendale et al. | |
| 10,623,408 B1 | 4/2020 | Marshall et al. | |
| 10,623,426 B1 | 4/2020 | Yumer et al. | |
| 10,699,018 B2 | 6/2020 | Hamby | |
| 10,708,291 B2 | 7/2020 | Findlay | |
| 10,735,456 B2 | 8/2020 | Crabtree et al. | |
| 10,771,498 B1 | 9/2020 | Tamhane et al. | |
| 10,831,994 B2 | 11/2020 | Iyengar | |
| 10,887,218 B2* | 1/2021 | Williams | H04L 63/0435 |
| 10,909,470 B2 | 2/2021 | Pietrobon et al. | |
| 10,924,503 B1 | 2/2021 | Pereira et al. | |
| 10,979,848 B1 | 4/2021 | Palappetty et al. | |
| 11,006,920 B2 | 5/2021 | Shah | |
| 11,050,679 B1* | 6/2021 | Przygienda | H04L 49/25 |
| 11,057,393 B2 | 7/2021 | Coffing | |
| 11,102,082 B1 | 8/2021 | Sarel et al. | |
| 11,102,233 B2 | 8/2021 | Schwartz et al. | |
| 11,190,641 B1 | 11/2021 | Shukla et al. | |
| 11,240,064 B2 | 2/2022 | Rubenstein et al. | |
| 11,277,426 B1 | 3/2022 | Kazemeyni | |
| 11,363,031 B2 | 6/2022 | Carnes et al. | |
| 11,363,051 B2 | 6/2022 | Izrael et al. | |
| 11,455,501 B2 | 9/2022 | Paula et al. | |
| 11,481,503 B2 | 10/2022 | Gitelman et al. | |
| 11,489,847 B1 | 11/2022 | Uplinger et al. | |
| 11,496,391 B1* | 11/2022 | Przygienda | H04L 45/42 |
| 11,526,392 B2 | 12/2022 | Shoham et al. | |
| 11,593,700 B1 | 2/2023 | Ansari et al. | |
| 11,765,176 B2 | 9/2023 | Viswanath et al. | |
| 11,824,877 B2 | 11/2023 | Friedlander et al. | |
| 11,824,880 B2 | 11/2023 | Tomer et al. | |
| 11,841,952 B2 | 12/2023 | Gitelman et al. | |
| 11,956,252 B2 | 4/2024 | Gitelman et al. | |
| 11,983,611 B2 | 5/2024 | Hanetz et al. | |
| 12,015,634 B2 | 6/2024 | Izrael et al. | |
| 12,026,248 B2 | 7/2024 | Shoham et al. | |
| 12,052,274 B2 | 7/2024 | Friedlander et al. | |
| 12,216,459 B2 | 2/2025 | Friedlander et al. | |
| 12,223,406 B2 | 2/2025 | Hanetz et al. | |
| 12,225,027 B2 | 2/2025 | Luk-Zilberman et al. | |
| 2001/0048661 A1 | 12/2001 | Clear et al. | |
| 2002/0078381 A1 | 6/2002 | Farley et al. | |
| 2003/0217024 A1 | 11/2003 | Kocher | |
| 2004/0049699 A1 | 3/2004 | Griffith et al. | |
| 2004/0064480 A1 | 4/2004 | Bartlett et al. | |
| 2004/0123091 A1 | 6/2004 | Das | |
| 2005/0002025 A1 | 1/2005 | Goto et al. | |
| 2005/0160480 A1 | 7/2005 | Birt et al. | |
| 2005/0188215 A1 | 8/2005 | Shulman et al. | |
| 2005/0198380 A1* | 9/2005 | Panasyuk | H04L 63/0272 709/239 |
| 2005/0209519 A1 | 9/2005 | Krishnan et al. | |
| 2006/0026273 A1 | 2/2006 | Comay et al. | |
| 2006/0026682 A1 | 2/2006 | Zakas | |
| 2006/0156402 A1* | 7/2006 | Stone | H04L 45/32 713/188 |
| 2006/0265746 A1 | 11/2006 | Farley et al. | |
| 2007/0142030 A1 | 6/2007 | Sinha et al. | |
| 2007/0209074 A1 | 9/2007 | Coffman | |
| 2007/0209075 A1 | 9/2007 | Coffman | |
| 2007/0288185 A1 | 12/2007 | Burch et al. | |
| 2008/0039058 A1 | 2/2008 | Ray | |
| 2008/0086776 A1 | 4/2008 | Tuvell et al. | |
| 2008/0126286 A1 | 5/2008 | Machani | |
| 2008/0200181 A1 | 8/2008 | Zill et al. | |
| 2008/0271143 A1 | 10/2008 | Stephens et al. | |

(56) References Cited

U.S. PATENT DOCUMENTS

| | | |
|---|---|---|
| 2008/0289027 A1 | 11/2008 | Yariv et al. |
| 2009/0138590 A1 | 5/2009 | Lee et al. |
| 2009/0172821 A1 | 7/2009 | Daira et al. |
| 2009/0235354 A1 | 9/2009 | Gray et al. |
| 2010/0023604 A1 | 1/2010 | Verma et al. |
| 2010/0081411 A1 | 4/2010 | Montenero |
| 2010/0125903 A1* | 5/2010 | Devarajan ............ H04L 63/102 709/224 |
| 2011/0046920 A1 | 2/2011 | Amis |
| 2011/0154497 A1 | 6/2011 | Bailey, Jr. |
| 2011/0251960 A1 | 10/2011 | Holla et al. |
| 2011/0258703 A1 | 10/2011 | Ramcharran |
| 2012/0072983 A1 | 3/2012 | Mccusker et al. |
| 2012/0096558 A1 | 4/2012 | Evrard |
| 2012/0150490 A1 | 6/2012 | Oyabu et al. |
| 2012/0185563 A1* | 7/2012 | Sugiyama ........... H04L 63/0281 709/217 |
| 2012/0250325 A1 | 10/2012 | Oki |
| 2013/0011030 A1 | 1/2013 | Tzoumas et al. |
| 2013/0042029 A1 | 2/2013 | Lu et al. |
| 2013/0067582 A1 | 3/2013 | Donovan et al. |
| 2013/0074143 A1 | 3/2013 | Bu et al. |
| 2013/0096980 A1 | 4/2013 | Basavapatna et al. |
| 2013/0097699 A1 | 4/2013 | Balupari et al. |
| 2013/0097711 A1 | 4/2013 | Basavapatna et al. |
| 2013/0127618 A1 | 5/2013 | Sheleheda et al. |
| 2013/0167196 A1 | 6/2013 | Spencer et al. |
| 2013/0179988 A1 | 7/2013 | Bekker et al. |
| 2013/0191919 A1 | 7/2013 | Basavapatna et al. |
| 2013/0227689 A1 | 8/2013 | Pietrowicz et al. |
| 2013/0239177 A1 | 9/2013 | Sigurdson et al. |
| 2013/0246088 A1 | 9/2013 | Huster et al. |
| 2013/0247194 A1 | 9/2013 | Jha et al. |
| 2013/0298230 A1 | 11/2013 | Kumar et al. |
| 2013/0340084 A1 | 12/2013 | Schrecker et al. |
| 2014/0173738 A1 | 6/2014 | Condry et al. |
| 2014/0215195 A1 | 7/2014 | Colbert et al. |
| 2014/0237545 A1 | 8/2014 | Mylavarapu et al. |
| 2014/0241373 A1 | 8/2014 | Pasam et al. |
| 2014/0247728 A1 | 9/2014 | Amitai et al. |
| 2014/0270347 A1 | 9/2014 | Xu et al. |
| 2014/0282905 A1 | 9/2014 | Iyer et al. |
| 2014/0283029 A1 | 9/2014 | Chandrasekaran et al. |
| 2014/0317270 A1 | 10/2014 | Besehanic |
| 2015/0009995 A1* | 1/2015 | Gross, IV ........... H04L 12/4633 370/392 |
| 2015/0052595 A1 | 2/2015 | Murphy |
| 2015/0067865 A1 | 3/2015 | Seacat et al. |
| 2015/0113133 A1 | 4/2015 | Srinivas et al. |
| 2015/0128236 A1 | 5/2015 | Moscicki et al. |
| 2015/0128274 A1 | 5/2015 | Giokas |
| 2015/0163121 A1 | 6/2015 | Mahaffey et al. |
| 2015/0163242 A1 | 6/2015 | Laidlaw et al. |
| 2015/0199913 A1 | 7/2015 | Mayfield et al. |
| 2015/0200827 A1 | 7/2015 | Agarwal et al. |
| 2015/0207811 A1 | 7/2015 | Feher et al. |
| 2015/0229664 A1 | 8/2015 | Hawthorn et al. |
| 2015/0271200 A1* | 9/2015 | Brady ................. H04L 63/1466 726/4 |
| 2015/0288744 A1 | 10/2015 | Dwan et al. |
| 2015/0295943 A1 | 10/2015 | Malachi |
| 2015/0326601 A1 | 11/2015 | Grondin et al. |
| 2015/0339912 A1 | 11/2015 | Farrand et al. |
| 2015/0346066 A1 | 12/2015 | Dutta et al. |
| 2015/0350228 A1 | 12/2015 | Baxley et al. |
| 2015/0350902 A1 | 12/2015 | Baxley et al. |
| 2015/0356421 A1 | 12/2015 | Jones et al. |
| 2015/0373043 A1 | 12/2015 | Wang et al. |
| 2015/0373483 A1 | 12/2015 | Verma et al. |
| 2015/0379371 A1 | 12/2015 | Yoon et al. |
| 2016/0044054 A1 | 2/2016 | Stiansen et al. |
| 2016/0050182 A1* | 2/2016 | Edross ................ H04L 63/1441 726/15 |
| 2016/0078229 A1 | 3/2016 | Gong et al. |
| 2016/0094578 A1 | 3/2016 | Mcquillan et al. |
| 2016/0099963 A1 | 4/2016 | Mahaffey et al. |
| 2016/0112878 A1 | 4/2016 | Kaushik |
| 2016/0127417 A1 | 5/2016 | Janssen |
| 2016/0127777 A1 | 5/2016 | Roberts et al. |
| 2016/0134588 A1 | 5/2016 | Falkowitz et al. |
| 2016/0173521 A1 | 6/2016 | Yampolskiy et al. |
| 2016/0203316 A1 | 7/2016 | Mace et al. |
| 2016/0219067 A1 | 7/2016 | Han et al. |
| 2016/0226911 A1 | 8/2016 | Boss et al. |
| 2016/0232358 A1 | 8/2016 | Grieco et al. |
| 2016/0253069 A1 | 9/2016 | Zapletal |
| 2016/0277427 A1 | 9/2016 | Deshpande et al. |
| 2016/0294854 A1 | 10/2016 | Parthasarathi et al. |
| 2016/0308898 A1* | 10/2016 | Teeple ................ H04L 63/1408 |
| 2016/0359872 A1 | 12/2016 | Yadav et al. |
| 2016/0359887 A1* | 12/2016 | Yadav ................. H04L 63/1425 |
| 2016/0359915 A1 | 12/2016 | Gupta et al. |
| 2016/0366040 A1 | 12/2016 | Nampelly et al. |
| 2016/0366155 A1 | 12/2016 | El-Moussa et al. |
| 2016/0380989 A1 | 12/2016 | Bailey et al. |
| 2017/0034161 A1 | 2/2017 | Isola et al. |
| 2017/0046510 A1 | 2/2017 | Chen et al. |
| 2017/0046519 A1 | 2/2017 | Cam |
| 2017/0063906 A1 | 3/2017 | Muddu et al. |
| 2017/0063912 A1 | 3/2017 | Muddu et al. |
| 2017/0063922 A1 | 3/2017 | Ibatullin et al. |
| 2017/0070380 A1 | 3/2017 | Bajpai et al. |
| 2017/0070419 A1* | 3/2017 | Singhal ................... H04L 67/02 |
| 2017/0070517 A1 | 3/2017 | Bailey et al. |
| 2017/0070523 A1 | 3/2017 | Bailey et al. |
| 2017/0078322 A1 | 3/2017 | Seiver et al. |
| 2017/0083307 A1 | 3/2017 | Aleksandrov et al. |
| 2017/0084269 A1 | 3/2017 | Shi et al. |
| 2017/0090499 A1 | 3/2017 | Dolan |
| 2017/0111813 A1 | 4/2017 | Townend et al. |
| 2017/0124478 A1 | 5/2017 | Baradaran et al. |
| 2017/0150939 A1 | 6/2017 | Shah |
| 2017/0180384 A1 | 6/2017 | Malenfant et al. |
| 2017/0208079 A1 | 7/2017 | Cammarota et al. |
| 2017/0214701 A1 | 7/2017 | Hasan |
| 2017/0220801 A1 | 8/2017 | Stockdale et al. |
| 2017/0223037 A1 | 8/2017 | Singh et al. |
| 2017/0244746 A1 | 8/2017 | Hawthorn et al. |
| 2017/0250855 A1 | 8/2017 | Patil et al. |
| 2017/0250979 A1 | 8/2017 | Benson et al. |
| 2017/0257363 A1 | 9/2017 | Franke et al. |
| 2017/0264644 A1 | 9/2017 | Mihan et al. |
| 2017/0272460 A1 | 9/2017 | Rusakov et al. |
| 2017/0279829 A1 | 9/2017 | Vasseur et al. |
| 2017/0289187 A1 | 10/2017 | Noel et al. |
| 2017/0324651 A1* | 11/2017 | Penno ..................... H04L 45/26 |
| 2017/0332238 A1 | 11/2017 | Bansal et al. |
| 2017/0339180 A1 | 11/2017 | Klein et al. |
| 2017/0353491 A1 | 12/2017 | Gukal et al. |
| 2017/0353498 A1 | 12/2017 | Huang et al. |
| 2017/0353499 A1 | 12/2017 | Huang et al. |
| 2017/0372232 A1 | 12/2017 | Maughan et al. |
| 2018/0004948 A1 | 1/2018 | Martin et al. |
| 2018/0032997 A1 | 2/2018 | Gordon et al. |
| 2018/0039789 A1* | 2/2018 | Sanchez ................ H04L 63/145 |
| 2018/0048534 A1 | 2/2018 | Banga et al. |
| 2018/0048666 A1* | 2/2018 | Alderson ................ H04L 63/10 |
| 2018/0054455 A1 | 2/2018 | Bercovich et al. |
| 2018/0096260 A1 | 4/2018 | Zimmer et al. |
| 2018/0097775 A1 | 4/2018 | Obaidi |
| 2018/0097840 A1 | 4/2018 | Murthy |
| 2018/0124091 A1 | 5/2018 | Sweeney et al. |
| 2018/0124096 A1 | 5/2018 | Schwartz et al. |
| 2018/0137287 A1 | 5/2018 | Han et al. |
| 2018/0144139 A1 | 5/2018 | Cheng et al. |
| 2018/0181749 A1 | 6/2018 | Kolacinski et al. |
| 2018/0191593 A1 | 7/2018 | De Knijf et al. |
| 2018/0225592 A1 | 8/2018 | Ponnuswamy |
| 2018/0247312 A1 | 8/2018 | Loganathan et al. |
| 2018/0260214 A1 | 9/2018 | Oberheide et al. |
| 2018/0270229 A1 | 9/2018 | Zhang et al. |
| 2018/0288045 A1* | 10/2018 | Karunakaran ........ H04L 63/101 |
| 2018/0309747 A1 | 10/2018 | Sweet et al. |

(56) References Cited

U.S. PATENT DOCUMENTS

| | | |
|---|---|---|
| 2018/0324193 A1 | 11/2018 | Ronen et al. |
| 2018/0330257 A1 | 11/2018 | Dodson et al. |
| 2018/0332069 A1 | 11/2018 | Moore et al. |
| 2018/0351987 A1 | 12/2018 | Patel et al. |
| 2018/0359278 A1 | 12/2018 | Rusakov et al. |
| 2018/0365397 A1 | 12/2018 | Viscarola et al. |
| 2018/0367548 A1* | 12/2018 | Stokes, III .......... H04L 63/1416 |
| 2019/0014137 A1 | 1/2019 | Du et al. |
| 2019/0020641 A1 | 1/2019 | Wasily et al. |
| 2019/0020670 A1 | 1/2019 | Brabec et al. |
| 2019/0034413 A1 | 1/2019 | Rosewell et al. |
| 2019/0036688 A1 | 1/2019 | Wasily et al. |
| 2019/0052554 A1 | 2/2019 | Mukerji et al. |
| 2019/0057378 A1 | 2/2019 | Rudnick et al. |
| 2019/0065736 A1 | 2/2019 | Dharmadhikari et al. |
| 2019/0075013 A1 | 3/2019 | Garcia et al. |
| 2019/0081922 A1 | 3/2019 | Vilenski et al. |
| 2019/0095587 A1 | 3/2019 | Warner et al. |
| 2019/0097907 A1 | 3/2019 | Nickolov et al. |
| 2019/0102361 A1 | 4/2019 | Muralidharan et al. |
| 2019/0102698 A1 | 4/2019 | Roberts et al. |
| 2019/0108443 A1 | 4/2019 | Dwarakanath et al. |
| 2019/0109820 A1* | 4/2019 | Clark ................... H04L 9/0861 |
| 2019/0114360 A1 | 4/2019 | Garg et al. |
| 2019/0116193 A1 | 4/2019 | Wang et al. |
| 2019/0124045 A1 | 4/2019 | Zong et al. |
| 2019/0132205 A1 | 5/2019 | Du et al. |
| 2019/0132286 A1 | 5/2019 | Holla et al. |
| 2019/0132344 A1 | 5/2019 | Lem et al. |
| 2019/0140994 A1 | 5/2019 | Snider et al. |
| 2019/0156042 A1 | 5/2019 | Kim et al. |
| 2019/0156198 A1 | 5/2019 | Mars et al. |
| 2019/0163598 A1 | 5/2019 | Harutyunyan et al. |
| 2019/0166141 A1 | 5/2019 | Xu et al. |
| 2019/0180193 A1 | 6/2019 | Sinha et al. |
| 2019/0190952 A1 | 6/2019 | Cherry |
| 2019/0215380 A1 | 7/2019 | Rykowski et al. |
| 2019/0215688 A1 | 7/2019 | Zavesky et al. |
| 2019/0216350 A1 | 7/2019 | Sullivan et al. |
| 2019/0217191 A1 | 7/2019 | Colenbrander |
| 2019/0238584 A1 | 8/2019 | Somasundaram et al. |
| 2019/0253455 A1 | 8/2019 | Xuan |
| 2019/0258807 A1 | 8/2019 | Dimaggio et al. |
| 2019/0258953 A1 | 8/2019 | Lang et al. |
| 2019/0260784 A1 | 8/2019 | Stockdale et al. |
| 2019/0260796 A1 | 8/2019 | Hamdi |
| 2019/0266323 A1* | 8/2019 | Nguyen ................ H04W 12/12 |
| 2019/0266324 A1* | 8/2019 | Edwards ................ G06F 21/55 |
| 2019/0268355 A1* | 8/2019 | Nisbet ................. H04L 63/1425 |
| 2019/0268775 A1* | 8/2019 | McDaid ............. H04L 63/1425 |
| 2019/0288852 A1 | 9/2019 | Shetye et al. |
| 2019/0294485 A1 | 9/2019 | Kukreja et al. |
| 2019/0295000 A1 | 9/2019 | Candel et al. |
| 2019/0297402 A1 | 9/2019 | Anderson et al. |
| 2019/0301979 A1 | 10/2019 | Kawanoue et al. |
| 2019/0303710 A1 | 10/2019 | Saha et al. |
| 2019/0306731 A1 | 10/2019 | Raghuramu et al. |
| 2019/0318100 A1 | 10/2019 | Bhatia et al. |
| 2019/0335405 A1* | 10/2019 | Wang ................ H04L 25/03019 |
| 2019/0362076 A1 | 11/2019 | Wang et al. |
| 2019/0372934 A1 | 12/2019 | Yehudai et al. |
| 2019/0379699 A1 | 12/2019 | Katragadda et al. |
| 2019/0380037 A1 | 12/2019 | Lifshitz et al. |
| 2019/0381242 A1 | 12/2019 | Ambrosina et al. |
| 2019/0392152 A1 | 12/2019 | Patel et al. |
| 2019/0392351 A1 | 12/2019 | Zuluaga et al. |
| 2020/0007436 A1* | 1/2020 | Williams ............. H04L 63/0435 |
| 2020/0051697 A1 | 2/2020 | Krishnamurti et al. |
| 2020/0065710 A1 | 2/2020 | Range et al. |
| 2020/0074084 A1 | 3/2020 | Dorrans et al. |
| 2020/0076853 A1 | 3/2020 | Pandian et al. |
| 2020/0092312 A1* | 3/2020 | Caldwell ............. H04L 63/0236 |
| 2020/0097651 A1 | 3/2020 | Mestha et al. |
| 2020/0106795 A1 | 4/2020 | Servajean et al. |
| 2020/0112571 A1 | 4/2020 | Koral et al. |
| 2020/0120144 A1 | 4/2020 | Yadav et al. |
| 2020/0134510 A1 | 4/2020 | Basel et al. |
| 2020/0137102 A1 | 4/2020 | Sheridan et al. |
| 2020/0143061 A1 | 5/2020 | Kim et al. |
| 2020/0145287 A1 | 5/2020 | Savalle et al. |
| 2020/0151616 A1 | 5/2020 | Mermoud et al. |
| 2020/0177613 A1 | 6/2020 | Nilangekar et al. |
| 2020/0195508 A1 | 6/2020 | Benjamin |
| 2020/0195669 A1 | 6/2020 | Karasaridis et al. |
| 2020/0195679 A1 | 6/2020 | Du |
| 2020/0201620 A1 | 6/2020 | Beard |
| 2020/0210592 A1 | 7/2020 | Karas et al. |
| 2020/0210871 A1 | 7/2020 | Alperovich et al. |
| 2020/0222010 A1 | 7/2020 | Howard |
| 2020/0226257 A1 | 7/2020 | Maimon et al. |
| 2020/0242488 A1 | 7/2020 | Medas et al. |
| 2020/0242505 A1 | 7/2020 | Raz et al. |
| 2020/0244677 A1 | 7/2020 | Abbaszadeh et al. |
| 2020/0250530 A1 | 8/2020 | Shen |
| 2020/0272933 A1 | 8/2020 | Zhou |
| 2020/0280575 A1 | 9/2020 | Dean et al. |
| 2020/0285737 A1 | 9/2020 | Kraus et al. |
| 2020/0311557 A1 | 10/2020 | Jin et al. |
| 2020/0314134 A1 | 10/2020 | Izrael et al. |
| 2020/0322369 A1 | 10/2020 | Raghuramu et al. |
| 2020/0334228 A1 | 10/2020 | Matyska et al. |
| 2020/0364561 A1 | 11/2020 | Ananthanarayanan et al. |
| 2020/0364612 A1 | 11/2020 | Siravara et al. |
| 2020/0379868 A1 | 12/2020 | Dherange et al. |
| 2020/0382373 A1 | 12/2020 | Mermoud et al. |
| 2020/0382472 A1 | 12/2020 | Salin et al. |
| 2020/0382527 A1 | 12/2020 | Mitelman et al. |
| 2020/0382536 A1 | 12/2020 | Dherange et al. |
| 2020/0396129 A1 | 12/2020 | Tedaldi et al. |
| 2020/0403854 A1 | 12/2020 | Arunachalam et al. |
| 2020/0403991 A1 | 12/2020 | Sohail et al. |
| 2020/0409690 A1 | 12/2020 | Rouland et al. |
| 2020/0410403 A1 | 12/2020 | Kamulete |
| 2020/0412757 A1 | 12/2020 | Siddiq |
| 2021/0004409 A1 | 1/2021 | Zamora et al. |
| 2021/0029153 A1 | 1/2021 | Sugimoto et al. |
| 2021/0042570 A1 | 2/2021 | Iskandar et al. |
| 2021/0049270 A1 | 2/2021 | Urmanov et al. |
| 2021/0056404 A1 | 2/2021 | Goswami et al. |
| 2021/0058394 A1 | 2/2021 | Zhang et al. |
| 2021/0064593 A1 | 3/2021 | Yeddu |
| 2021/0065038 A1 | 3/2021 | Gu et al. |
| 2021/0067548 A1 | 3/2021 | Brandt et al. |
| 2021/0073658 A1 | 3/2021 | Poole et al. |
| 2021/0083983 A1* | 3/2021 | Chin .................... H04L 63/029 |
| 2021/0092094 A1* | 3/2021 | Kim ...................... H04L 63/08 |
| 2021/0092095 A1* | 3/2021 | Kim .................. H04L 63/0876 |
| 2021/0092117 A1 | 3/2021 | Zhang et al. |
| 2021/0092136 A1 | 3/2021 | Woodworth et al. |
| 2021/0097177 A1 | 4/2021 | Chistyakov et al. |
| 2021/0105613 A1 | 4/2021 | San et al. |
| 2021/0111990 A1* | 4/2021 | Nainar ..................... H04L 45/28 |
| 2021/0112087 A1 | 4/2021 | Tassoumt et al. |
| 2021/0126931 A1 | 4/2021 | Babu et al. |
| 2021/0133346 A1 | 5/2021 | Alsharif et al. |
| 2021/0160266 A1 | 5/2021 | Sternby et al. |
| 2021/0173760 A1 | 6/2021 | Downie et al. |
| 2021/0185058 A1 | 6/2021 | Gitelman et al. |
| 2021/0185083 A1 | 6/2021 | Azaria et al. |
| 2021/0203575 A1 | 7/2021 | Hanetz et al. |
| 2021/0203688 A1* | 7/2021 | Ghule ................. H04L 63/1425 |
| 2021/0232291 A1 | 7/2021 | Abdulaal et al. |
| 2021/0250325 A1 | 8/2021 | Teflian et al. |
| 2021/0264035 A1 | 8/2021 | Gitelman et al. |
| 2021/0264036 A1 | 8/2021 | Gitelman et al. |
| 2021/0329029 A1 | 10/2021 | Vasseur et al. |
| 2021/0342207 A1 | 11/2021 | Oliveri et al. |
| 2021/0365478 A1 | 11/2021 | Mopur et al. |
| 2021/0378577 A1 | 12/2021 | Sun et al. |
| 2021/0405984 A1 | 12/2021 | Agarwal et al. |
| 2022/0058347 A1 | 2/2022 | Singaraju et al. |
| 2022/0060449 A1* | 2/2022 | Head, Jr. ................ H04L 63/029 |
| 2022/0070183 A1* | 3/2022 | Goyal ................. H04L 63/0236 |
| 2022/0086071 A1 | 3/2022 | Sivaraman et al. |

(56) References Cited

U.S. PATENT DOCUMENTS

| | | |
|---|---|---|
| 2022/0086179 A1 | 3/2022 | Levin et al. |
| 2022/0138321 A1 | 5/2022 | Shrestha et al. |
| 2022/0138504 A1 | 5/2022 | Fathi et al. |
| 2022/0150264 A1 | 5/2022 | Friedlander et al. |
| 2022/0188087 A1 | 6/2022 | Montag et al. |
| 2022/0191761 A1 | 6/2022 | Feng et al. |
| 2022/0210079 A1 | 6/2022 | Koren et al. |
| 2022/0210190 A1 | 6/2022 | Weber et al. |
| 2022/0231993 A1* | 7/2022 | Sharma ............. H04L 63/0272 |
| 2022/0239682 A1 | 7/2022 | Ben Zvi et al. |
| 2022/0247786 A1 | 8/2022 | Vavilala et al. |
| 2022/0263853 A1 | 8/2022 | Izrael et al. |
| 2022/0276931 A1 | 9/2022 | Chen et al. |
| 2022/0278984 A1 | 9/2022 | Sarel et al. |
| 2022/0311789 A1 | 9/2022 | Luk-Zilberman et al. |
| 2022/0327219 A1 | 10/2022 | Choi et al. |
| 2022/0327221 A1 | 10/2022 | Gitelman et al. |
| 2022/0391300 A1 | 12/2022 | Trapani et al. |
| 2022/0398307 A1 | 12/2022 | Shoham et al. |
| 2022/0414230 A1 | 12/2022 | Gitelman et al. |
| 2023/0004856 A1 | 1/2023 | Shoham et al. |
| 2023/0004857 A1 | 1/2023 | Shoham et al. |
| 2023/0011129 A1 | 1/2023 | Wuhib et al. |
| 2023/0014556 A1 | 1/2023 | Schuler et al. |
| 2023/0088415 A1 | 3/2023 | Friedlander et al. |
| 2023/0090050 A1 | 3/2023 | Kellner et al. |
| 2023/0143024 A1 | 5/2023 | Friedlander et al. |
| 2023/0216853 A1 | 7/2023 | Shoham et al. |
| 2023/0300167 A1* | 9/2023 | Brecl .................. H04L 63/029 726/13 |
| 2023/0306297 A1 | 9/2023 | Friedlander et al. |
| 2023/0336580 A1 | 10/2023 | Luk-Zilberman et al. |
| 2023/0344775 A1* | 10/2023 | Parekh .................... H04L 45/00 |
| 2023/0370334 A1 | 11/2023 | Mannengal et al. |
| 2023/0388106 A1 | 11/2023 | Craciun et al. |
| 2023/0394136 A1 | 12/2023 | Shoham et al. |
| 2023/0412626 A1* | 12/2023 | Wright .................. H04L 41/16 |
| 2024/0080299 A1* | 3/2024 | Kim .................... H04L 63/0236 |
| 2024/0089277 A1 | 3/2024 | Friedlander et al. |
| 2024/0154984 A1 | 5/2024 | Friedlander et al. |
| 2024/0250967 A1 | 7/2024 | Gitelman et al. |
| 2024/0414182 A1 | 12/2024 | Friedlander et al. |
| 2024/0414187 A1 | 12/2024 | Izrael et al. |
| 2025/0036748 A1 | 1/2025 | Shoham et al. |
| 2025/0133106 A1 | 4/2025 | Hasan |

FOREIGN PATENT DOCUMENTS

| | | |
|---|---|---|
| CN | 103368979 A | 10/2013 |
| CN | 103874069 A | 6/2014 |
| CN | 104426906 A | 3/2015 |
| CN | 104520871 A | 4/2015 |
| CN | 105554009 A | 5/2016 |
| CN | 103812861 B | 2/2017 |
| CN | 106462531 A | 2/2017 |
| CN | 106846806 A | 6/2017 |
| CN | 107743108 A | 2/2018 |
| CN | 108632279 A | 10/2018 |
| CN | 108780479 A | 11/2018 |
| CN | 108885659 A | 11/2018 |
| CN | 108900476 A | 11/2018 |
| CN | 109063745 A | 12/2018 |
| CN | 109246685 A | 1/2019 |
| CN | 110115015 A | 8/2019 |
| CN | 110502677 A | 11/2019 |
| CN | 110583003 A | 12/2019 |
| CN | 110661759 A | 1/2020 |
| CN | 111091068 A | 5/2020 |
| CN | 107667505 B | 12/2020 |
| CN | 112019494 A | 12/2020 |
| CN | 112560045 A | 3/2021 |
| CN | 112802086 A | 5/2021 |
| CN | 114255830 A | 3/2022 |
| CN | 114270347 A | 4/2022 |
| EP | 3111614 A1 | 1/2017 |
| EP | 3154242 A1 | 4/2017 |
| EP | 3220595 A1 | 9/2017 |
| EP | 3349414 A1 | 7/2018 |
| EP | 3442164 A1 | 2/2019 |
| EP | 3451219 A1 | 3/2019 |
| EP | 3745291 A1 | 12/2020 |
| EP | 3896543 A1 | 10/2021 |
| EP | 3948600 A1 | 2/2022 |
| JP | 2012222461 A | 11/2012 |
| JP | 5301669 B2 | 9/2013 |
| JP | 2018-521430 A | 8/2018 |
| JP | 2019-179395 A | 10/2019 |
| KR | 10-0974888 B1 | 8/2010 |
| RU | 124102 U1 | 1/2013 |
| RU | 2750554 C2 | 6/2021 |
| WO | 2013/075890 A1 | 5/2013 |
| WO | 2014/128253 A1 | 8/2014 |
| WO | 2015/113036 A1 | 7/2015 |
| WO | 2016/196820 A1 | 12/2016 |
| WO | 2017/127850 A1 | 7/2017 |
| WO | 2018/057945 A1 | 3/2018 |
| WO | 2018/071845 A1 | 4/2018 |
| WO | 2018/080975 A1 | 5/2018 |
| WO | 2018/080976 A1 | 5/2018 |
| WO | 2018/182442 A1 | 10/2018 |
| WO | 2018/213205 A1 | 11/2018 |
| WO | 2019/064237 A1 | 4/2019 |
| WO | 2019/164484 A1 | 8/2019 |
| WO | 2020/005258 A1 | 1/2020 |
| WO | 2020/093020 A1 | 5/2020 |
| WO | 2020/124037 A1 | 6/2020 |
| WO | 2020/136635 A1 | 7/2020 |
| WO | 2020/141486 A1 | 7/2020 |
| WO | 2020/205258 A1 | 10/2020 |
| WO | 2021/105995 A1 | 6/2021 |
| WO | 2022/103630 A1 | 5/2022 |

OTHER PUBLICATIONS

Abdalla. H. S. et al., "Iot device identification via network-flow based fingerprinting and learning", In 2019 18th IEEE international conference on trust, security and privacy in computing and communications/13th IEEE international conference on big data science and engineering (TrustCom/BigDataSE), Aug. 31, 2019, pp. 103-111.

Aechan Kim • Mohyun Park • Dong Hoon Lee: AI-IDS: Application of Deep Learning to Real-Time Web Intrusion Detection; IEEE Access (vol. 8, 2020, pp. 70245-70261); (Year: 2020).

Alsuwaidi et al., "Security Vulnerabilities Detected in Medical Devices", 12th Annual Undergraduate Research Conference on Applied Computing (URC2020), United Arab Emirates University, College of IT, Department of Information Systems and Security, 6 pages (Year: 2020).

Amin et al., "CADENCE: Conditional Anomaly Detection for Events Using Noise-Contrastive Estimation", Proceedings of the 12th ACM Workshop on Artificial Intelligence and Security, Nov. 11, 2019.

Andzinski et al. Anomaly detection in DNS traffic, Clustering-based approach, Nov. 5, 2019, https://www.icann.org/sites/default/files/packages/ids-2019/05-andzinski-anomaly-detection-in-dns-traffic-11may19-en.pdf.

Ang Cui et al., "When Firmware Modifications Attack: A Case Study of Embedded Exploitation", Jan. 1, 2013, XP055711221, DOI: 10.7916/D8P55NKB, Retrieved from the Internet: URL:https://web.archive.org/web/20150926051553if_/http://ids.cs.columbia.edu/sites/default/files/ndss-2013.pdf.

Anna L. Buczak • Erhan Guven; A Survey of Data Mining and Machine Learning Methods for Cyber Security Intrusion Detection; IEEE Communications Surveys & Tutorials (vol. 18, Issue: 2, 2016, pp. 1153-1176); (Year: 2016).

Anonymous authors. "Neural Networks with Block Diagonal Inner Product Layers". https://openreview.net/pdf?id=Hyl5ro0pW. 2018.

Anonymous: "Recovery", Nov. 20, 2019, pp. 1-16, XP093108397, Retrieved from the Internet on Dec. 4, 2024: URL: https://web.archive.org/web/20191120050356/https://hack-technicolor.readthedocs.io/en/stable/Recovery/.

(56) References Cited

OTHER PUBLICATIONS

ArcGIS for Desktop. "Overlay analysis" Accessed Jun. 30, 2021. https://desktop.arcgis.com/en/arcmap/10.3/analyze/commonly-used-tools/overlay-analysis.htm.

Breck, et al., "Data Validation for Machine Learning," MLSys, Dec. 31, 2019, retrieved from https://proceedings.misys.org/book/2019/file/5878a7ab84fb43402106c575658472fa-Paper.pdf.

Brokmeier, Pascal, "An Overview of Categorical Input Handling for Neural Networks", Towards Data Science, Jan. 15, 2019.

Chandola, et al., "Anomaly Detection: A Survey". ACM Computing Surveys, vol. 41, No. 3, Article 15, 2009, pp. 1-72.

Cieslak, D. A. et al., "Detecting Fractures in Classifier Performance", Data Mining, 2007, Icdm 2007, Seventh Ieee International Conference on, IEEE, Oct. 28, 2007, pp. 123-132.

Creager, "How can anomalous IoT device activity be detected?," Jul. 17, 2018, retrieved from https://www.techtarget.com/iotagenda/blog/IoT-Agenda/How-can-anomalous-IoT-device-activity-be-detected, 3 pages.

Cvitic, Ivan, et al. "Ensemble machine learning approach for classification of IoT devices in smart home." International Journal of Machine Learning and Cybernetics 12.11 (2021): 3179-3202. (Year: 2021).

Daniel Minoli • Benedict Occhiogrosso; Current and Evolving Applications to Network Management; Wiley-IEEE Press 2023 (Edition : 1); (Year: 2023).

Daniel Wood, Cleartext Data Transmissions in Consumer IoT Medical Devices, IoT S&P'17, Nov. 3, 2017, Dallas, TX, USA, pp. 7-12 (Year: 2017).

David Zaldivar, Investigating the Security Threats on Networked Medical Devices, Published in: 2020 10th Annual Computing and Communication Workshop and Conference (CCWC), Date of Conference: Jan. 6-8, 2020, 6 pages (Year: 2020).

Deng et al., Sparse Support Vector Machine for Network Behavior Anomaly Detection, 2020 IEEE 8th International Conference on Information, Communication and Networks (ICICN) Year: 2020 | Conference Paper | Publisher: IEEE.

Dufka, "Comparison of Machine Learning Methods for Operating System Identification," Masaryk University Thesis, 2018, retrieved from https://is.muni.cz/th/wmu8d/thesis.pdf.

Emma McMahon, Assessing medical device vulnerabilities on the Internet of Things, Published in: 2017 IEEE International Conference on Intelligence and Security Informatics (ISI), Date of Conference: Jul. 22-24, 2017, 3 pages (Year: 2017).

Feng, Wenbo, et al. "Network protocol recognition based on convolutional neural network." China Communications 17.4 (2020): 125-139. (Year: 2020).

Gama, J. et al., "Learning with Drift Detection" In: "Learning with Drift Detection", Jan. 1, 2004, XP055657564, vol. 3171, pp. 286-295.

Gnanaprakasam Pandian, Security Challenges of IoT and Medical Devicesin Healthcare, Book: Internet of Things, Edition: 1st Edition, 20 pages (Year: 2020).

Hagos et al., "A Machine Learning Based Tool for Passive OS Fingerprinting With TCP Variant" (Year: 2021).

Harisha Guna, Pankaj Kumar, Anshu Sinha; Cisco TAC Engineer(s). Cisco. "DHCP Parameter Request List Option 55 Used to Profile Endpoints Configuration Example" Updated: Feb. 3, 2021.

Hershey et al., Approximating the Kullback Leibler Divergence Between Gaussian Mixture Models, IBM T.J. Watson Research Center, IEEE 2007, pp. 317-320 (Year: 2007).

Ian Stine, A cyber risk scoring system for medical devices, International Journal of Critical Infrastructure Protection vol. 19, Dec. 2017, pp. 32-46 (Year: 2017).

International Preliminary Report on Patentability received for PCT Patent Application No. PCT/IB23/057105, mailed on Jan. 23, 2025, 6 pages.

Jake Beavers, Sina Pournouri, Recent Cyber Attacks and Vulnerabilities in Medical Devices and Healthcare Institutions, Apr. 9, 2019, Part of the Advanced Sciences and Technologies for Security Applications book series (ASTSA), https://link.springer.com/chapter/10.1007/978-3-030-11289-9_11 (Year: 2 019).

Jibran Saleem; A state of the art survey—Impact of cyber aacks on SME's; ACM:2017; pp. 1-7.

Joao, G. et al., "On evaluating stream learning algorithms", Machine Learning, vol. 90, No. 3, Oct. 24, 2012, pp. 317-346.

Johnson, Daniel. "NLTK Tokenize: Words and Sentences Tokenizer with Example". Updated Mar. 8, 2022. https://www.guru99.com/tokenize-words-sentences-nltk.html.

Kumar, Ajitesh, "Machine Learning—Training, Validation & Test Data Set", retrieved on Jun. 13, 2021. Retrieved fromhttps://web.archive.org/web/20210728064012/https://vitalflux.com/machine-learning-training-validation-test-data-set/.

Lamba, et al., "Mitigating Cyber Security Threats of Industrial Control Systems (Scada & DCS)," International Journal for Technological Research in Engineering, 2017, pp. 31-34.

Li, Qianmu; Meng, Shunmei; Zhang, Sainan; Wu, Ming; Zhang, Jing; Ahvanooey, Milad Taleby; Aslam, Muhammad Shamrooz; Safety Risk Monitoring of Cyber-Physical Power Systems Based on Ensemble Learning Algorithm; IEEE Access (vol. 7, pp. 24788-24805); (Year: 2019).

Liu, et al., "Isolation Forest" 2008 Eight IEEE International Conference on Data Mining, 2009, pp. 413-422.

Markus, M., et al., "IoT Sentinel Demo: Automated Device-Type Identification for Security Enforcement in IoT", Proceedings of the International Conference on Distributed Computing Systems, IEEE Computer Society, Jun. 5, 2017, pp. 2511-2514.

Martin, et al., "Decomposition of MAC Address Structure for Granular Device Inference," ACSAC, 2016, Los Angeles, CA, pp. 78-88.

Mohamed Abomhara; Cyber Security and the Internet of Things: Vulnerabilities, Threats, Intruders and Attacks; University of Agder, Norway; year: 2015; pp. 1-24.

Noguchi, Hirofumi, Misao Kataoka, and Yoji Yamato. "Device identification based on communication analysis for the internet of things." IEEE Access 7 (2019): 52903-52912. (Year: 2019).

Pandian, "Security Challenges of IoT and Medical Devices in Healthcare," Internet of Things, 1st Edition, 2020, Chapter 6, pp. 87-106.

Peltier Tech: Peltier Technical Services—Excel Charts and Programming. "Histogram With Normal Curve Overlay". Accessed Jun. 30, 2021. https://peltiertech.com/histogram-normal-curve-overlay/.

Peter J. Rousseeuw and Katrien Van Driessen. "A Fast Algorithm for the Minimum Covariance Determinant Estimator". Technometrics, 1999. pp. 212-223. vol. 41.3. U.S.

Rihan et al. Abnormal Network Traffic Detection based on Clustering and Classification Techniques: DoS Case Study, A Thesis Submitted in Partial Fulfillment of the Requirement for the Degree of Master in Information Technology https://library.iugaza.edu.ps/thesis/110094.pdf.

Rohani, A., Taki, M., & Abdollahpour, M. (2018). A novel soft computing model (Gaussian process regression with K-fold cross validation) for daily and monthly solar radiation forecasting (Part: I). In Renewable Energy (vol. 115, pp. 411-422). Elsevier BV. https://doi.org/10.1016/j.renene.2017.08.061 (Year: 2017).

Scikit Learn. "3.3. Metrics and scoring: quantifying the quality of predictions" Accessed Jun. 30, 2021. https://scikit-learn.org/stable/modules/model_evaluation.html.

Seraphin B. Calo • Dinesh Verma • Maroun Touma • Franck Le • Douglas Freimuth . Erich Nahum; An AI Enabled System for Distributed System Characterization; 2019 IEEE International Conference on Cognitive Computing (ICCC) (2019, pp. 10-18); (Year: 2019).

Splunk Machine Learning Tool Kit User Guide. "Scoring metrics in the Machine Learning Toolkit" Accessed Jun. 30, 2021. https://docs.splunk.com/Documentation/MLApp/5.2.1/User/ScoreCommand.

Stack Overflow. "Overlay normal curve to histogram in R". Accessed Jun. 30, 2021. https://stackoverflow.com/questions/20078107/overlay-normal-curve-to-histogram-in-r.

Tahreem Yaqoob, Haider Abbas, Security Vulnerabilities, Attacks, Countermeasures, and Regulations of Networked Medical Devices,

(56) References Cited

OTHER PUBLICATIONS

IEEE Communications Surveys & Tutorials, vol. 21, No. 4, Fourth Quarter 2019, 46 pages (Year: 2019).
Tom Mahler, A New Methodology for Information Security Risk Assessment for Medical Devices and Its Evaluation, The Department of Software and Information Systems Engineering (SISE), Ben-Gurion University of the Negev, Israel, 24 pages (Year: 2020).
Travis' Blog random snippets and information. "Histogram with normal distribution overlay in Excel". Accessed Jun. 30, 2021. https://thydzik.com/histogram-with-normal-distribution-overlay-in-excel/.
Wazen M. Shbair et al "A Multi-Level Framework to Identify HTTPS Services". 2016 IEEE/IFIP Network Operations and Management Symposium (NOMS 2016).
Wenchao Cui and Minghao Gou "Design and Implementation of a SSH Proxy System Based on B/S Architecture" 2021 J. Phys.: Conf. Ser. 2010 012020.
Williams et al., "Cybersecurity vulnerabilities in medical devices: a complex environment and multifaceted problem", 2015, eHealth Research Group and Security Research Institute, Edith Cowan University, Perth, WA, Australia Correspondence: School of Computer and security (Year: 2015).
Xu, S.: "Politecnico Di Milano Machine Learning Techniques for Fault Detection in Chemical Processes, The Tennessee Eastman Process case study", Dec. 31, 2019.
Yu, et al., "Wdmti: wireless device manufacturer and type identification using hierarchical dirichlet process," 2018 IEEE 15th International Conference on Mobile Ad Hoc and Sensor Systems, pp. 19-27, Oct. 2018.
Yu, et al., "You Are What You Broadcast: Identification of Mobile and IoT Devices from (Public) Wifi," USENIX Security Symposium, Aug. 2020, pp. 55-72.
Zhang et al., "Network Anomaly Detection Based on Cooperative Semi-Supervised Support Vector Machine," 2019 International Conference on Networking and Network Applications (NaNA) Year: 2019 | Conference Paper | Publisher: IEEE.
Zhang, et al., "Active balancing mechanism for imbalanced medical data in deep learning-based classification models," ACM Transactions on Multimedia Computing, Communications and Applications (TOMM), Mar. 2020, retrieved from https://dl.acm.org/doi/pdf/10.1145/3357253 (Year: 2020).

\* cited by examiner

MALICIOUS LATERAL MOVEMENT DETECTION USING REMOTE SYSTEM PROTOCOLS

TECHNICAL FIELD

The present disclosure relates generally to detecting malicious traffic, and more specifically to detecting malicious traffic in tunnels of remote system protocols.

BACKGROUND

Remote system protocols such as the Remote Desktop Protocol (RDP) allow a user of one system to connect to and access another computer over one or more networks. For RDP, the user is provided with a graphical user interface (GUI) which allows them to remotely control the other computer and perform actions such as accessing the remote computer's desktop, opening and editing files stored on the remote computer, using applications installed on the remote computer, and the like.

Remote system protocols allow for convenient access to remote computers and the data stored thereon. Remote system protocols may enable tunneling, which is often used benignly by information technology (IT) staff. However, tunneling via remote system protocols introduce can also be exploited by malicious individuals. For example, remote system protocols may be used to send packets over networks even when those packets are not created with respect to protocols supported by those networks. This may allow for unauthorized actions such as bypassing firewalls. Use of remote system protocols therefore exposes the remote system to additional cybersecurity threats.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for malicious lateral movement detection. The method comprises: identifying a plurality of atomic tunnels based on data including packets sent between devices among a plurality of devices, wherein each atomic tunnel is a structure representing communications among the plurality of devices defined with respect to at least three nodes and at least two edges, each node representing a respective device of the plurality of devices, each edge representing a connection between two of the plurality of devices, each atomic tunnel having two hops, wherein each hop is a level of communication in which a packet is sent from one device to another device; identifying a plurality of tunnel constructs, wherein each tunnel construct is a structure including at least one of the plurality of atomic tunnels; determining a potentially malicious atomic tunnel among the plurality of atomic tunnels by comparing the edges of each of the plurality of atomic tunnels to a plurality of edges of a plurality of previously observed tunnel constructs; determining a potentially malicious tunnel, wherein the potentially malicious tunnel includes the potentially malicious atomic tunnel; and performing at least one mitigation action based on the determined potentially malicious tunnel.

Certain embodiments disclosed herein also include a non-transitory computer readable medium having stored thereon causing a processing circuitry to execute a process, the process comprising: identifying a plurality of atomic tunnels based on data including packets sent between devices among a plurality of devices, wherein each atomic tunnel is a structure representing communications among the plurality of devices defined with respect to at least three nodes and at least two edges, each node representing a respective device of the plurality of devices, each edge representing a connection between two of the plurality of devices, each atomic tunnel having two hops, wherein each hop is a level of communication in which a packet is sent from one device to another device; identifying a plurality of tunnel constructs, wherein each tunnel construct is a structure including at least one of the plurality of atomic tunnels; determining a potentially malicious atomic tunnel among the plurality of atomic tunnels by comparing the edges of each of the plurality of atomic tunnels to a plurality of edges of a plurality of previously observed tunnel constructs; determining a potentially malicious tunnel, wherein the potentially malicious tunnel includes the potentially malicious atomic tunnel; and performing at least one mitigation action based on the determined potentially malicious tunnel.

Certain embodiments disclosed herein also include a system for malicious lateral movement detection. The system comprises: a processing circuitry; and a memory, the memory containing instructions that, when executed by the processing circuitry, configure the system to: identify a plurality of atomic tunnels based on data including packets sent between devices among a plurality of devices, wherein each atomic tunnel is a structure representing communications among the plurality of devices defined with respect to at least three nodes and at least two edges, each node representing a respective device of the plurality of devices, each edge representing a connection between two of the plurality of devices, each atomic tunnel having two hops, wherein each hop is a level of communication in which a packet is sent from one device to another device; identify a plurality of tunnel constructs, wherein each tunnel construct is a structure including at least one of the plurality of atomic tunnels; determine a potentially malicious atomic tunnel among the plurality of atomic tunnels by comparing the edges of each of the plurality of atomic tunnels to a plurality of edges of a plurality of previously observed tunnel constructs; determine a potentially malicious tunnel, wherein the potentially malicious tunnel includes the potentially malicious atomic tunnel; and perform at least one mitigation action based on the determined potentially malicious tunnel.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
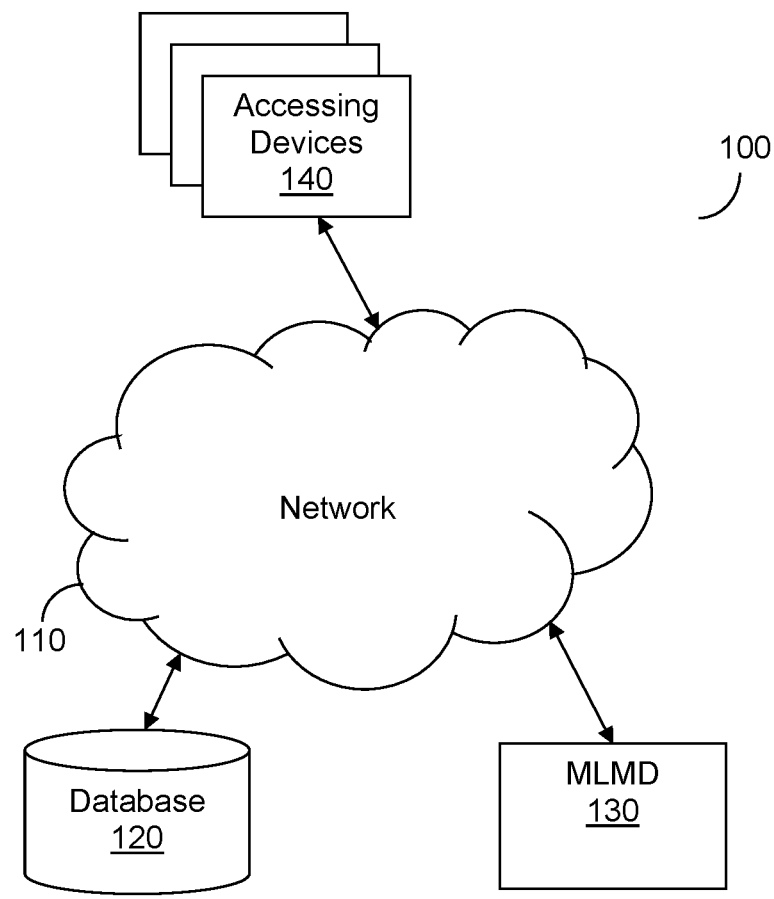
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting malicious lateral movement using remote system protocols. The disclosed embodiments provide techniques for detecting abnormal tunnels realized via remote system protocols, which can potentially lead to network hacking and data breaches. These abnormal tunnels may be further analyzed to determine whether they are malicious. Traffic occurring via these malicious tunnels can therefore be detected as malicious lateral movement using remote system protocols.

In an embodiment, potentially malicious tunnels are first identified for further analysis. Tunnels between and among three or more devices communicating using remote system protocols are identified based on edges, where each edge is a connection between two of those devices. For each edge, it is determined whether the respective connection is a statistical outliers as compared to the same connection demonstrated in a train data set. Each tunnel having one or more edges that are each either new edges or statistical outliers is identified as a potentially malicious tunnel.

Once potentially malicious tunnels have been identified, they are further analyzed in order to determine whether each potentially malicious tunnel represents a cybersecurity threat by allowing malicious lateral movement. To this end, all tunnels in the train data set are classified with respect to isomorphism, i.e., such that the tunnels are classified into classes with other tunnels having the same structure. Such a structure may be a graph structure characterizing the work style for the tunnel. The identified potentially malicious tunnels are compared to the isomorphic classes, and may be subjected to further analysis depending on whether and which classes those potentially malicious tunnels match. Based on the comparison and any subsequent analysis, it is determined whether to detect those potentially malicious tunnels as malicious tunnels, an alert level to be used for alerting on each malicious tunnel, or both.

FIG. 1 shows an example network diagram 100 utilized to describe the various disclosed embodiments. In the example network diagram 100, a database 120, a malicious lateral movement detector (MLMD) 130, a plurality of devices 140 (hereinafter referred to individually as a device 140 and collectively as devices 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The database 120 may store data related to connections between and among the devices 140. Such data indicates connections between different devices among the devices 140. The malicious lateral movement detector 130 is configured to detect malicious tunnels as described herein. To this end, the malicious lateral movement detector 130 is configured to analyze the data related to connections between and among the devices 140 in order to identify tunnels and determine whether those tunnels are malicious. The malicious lateral movement detector 130 may further be configured to perform mitigation actions related to malicious tunnels formed via connections between and among the accessing devices 140 such as, but not limited to, generating alerts, severing connections between the accessing devices 140, and the like.

Each of the devices 140 may be, but is not limited to, a personal computer (e.g., a desktop computer), a laptop, a tablet computer, a smartphone, a wearable computing device, or any other device capable of connecting to another device over one or more networks. The devices 140 include one or more remotely accessed devices which are accessed via one or more other devices among the devices 140 using one or more remote system protocols such as, but not limited to, the Remote Desktop Protocol (RDP). One or more of the devices 140 may act as tunneling devices which allow for establishing tunnels among 3 or more devices as described herein by being connected to each of two other devices.

Figure 2A:
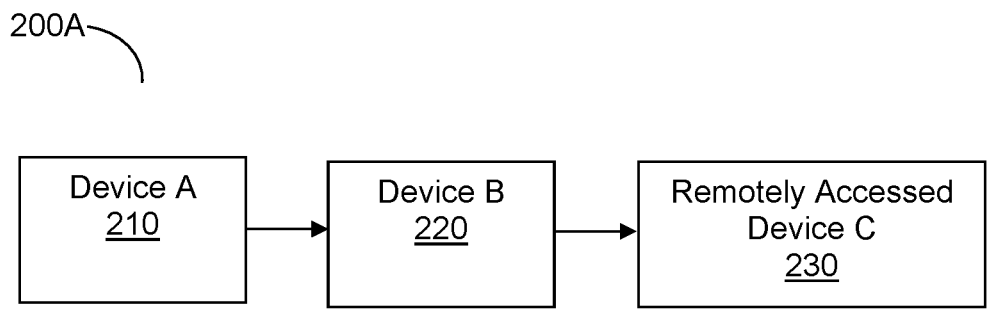
FIGS. 2A-B are tunnel diagrams showing example simple tunnel structures which may be realized via remote system protocols utilized to describe various disclosed embodiments.
Figure 2B:
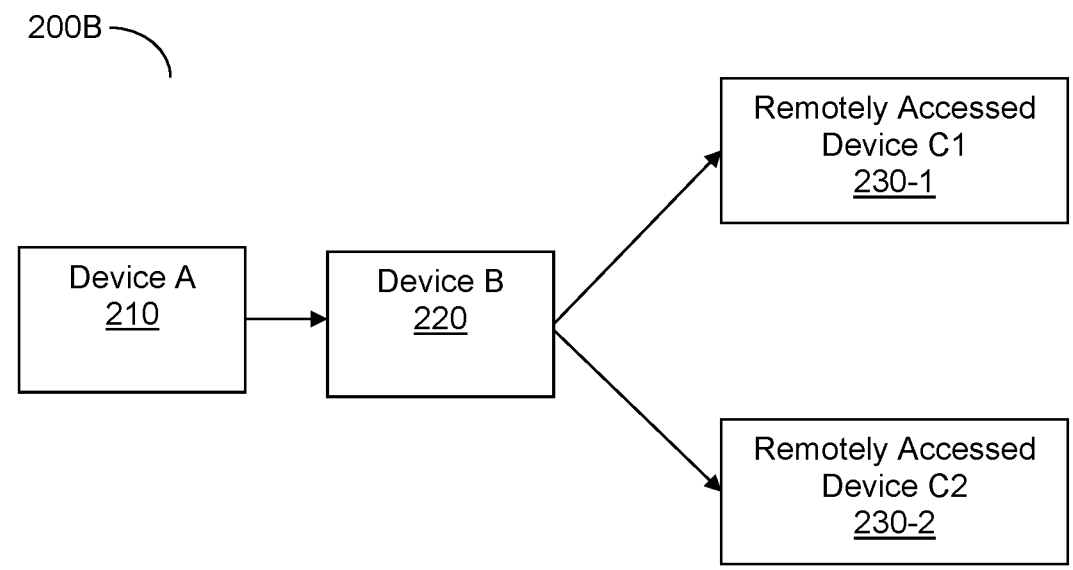

FIGS. 2A-B are tunnel diagrams showing example simple tunnel structures which may be realized via remote system protocols utilized to describe various disclosed embodiments.

In FIG. 2A, a first kind of simple tunnel 200A is shown. A simple tunnel is an atomic structure of a tunnel including two hops which can, in combination with other simple tunnels, form a more complex tunnel structure. The simple tunnel 200A includes a device A 210 connected to a device B 220, which in turn is connected to a remotely accessed device C 230. In FIG. 2A, the device A 210 accesses the remotely accessed device C 230 via the device B 220. Accordingly, the device B 220 acts as a tunneling device by which access between the accessing device A 210 and the remotely accessed device C 230 is realized.

In FIG. 2B, a second kind of simple tunnel 200B is shown. The simple tunnel 200B includes a device A 210 connected to a device B 220, which in turn is connected to two remotely accessed devices C1 230-1 and C2 230-2.

Both of the simple tunnels 200A and 200B are atomic structures including two hops among devices, where a packet being tunneled from device A 210 to a remotely accessed device (i.e., C230, C1 230-1, or C2 230-2) passes through two connections (i.e., a connection from device A 210 to device B 220 and a connection from device B 220 to a remotely accessed device). In other words, for each hop in a tunnel, a packet being sent through the tunnel passes through a connection between a first device and a second device. A simple tunnel therefore includes two hops such that a packet being sent through the simple tunnel passes between two such connections, regardless of whether different packets ultimately are sent to the same remotely accessed device.

Figure 3:
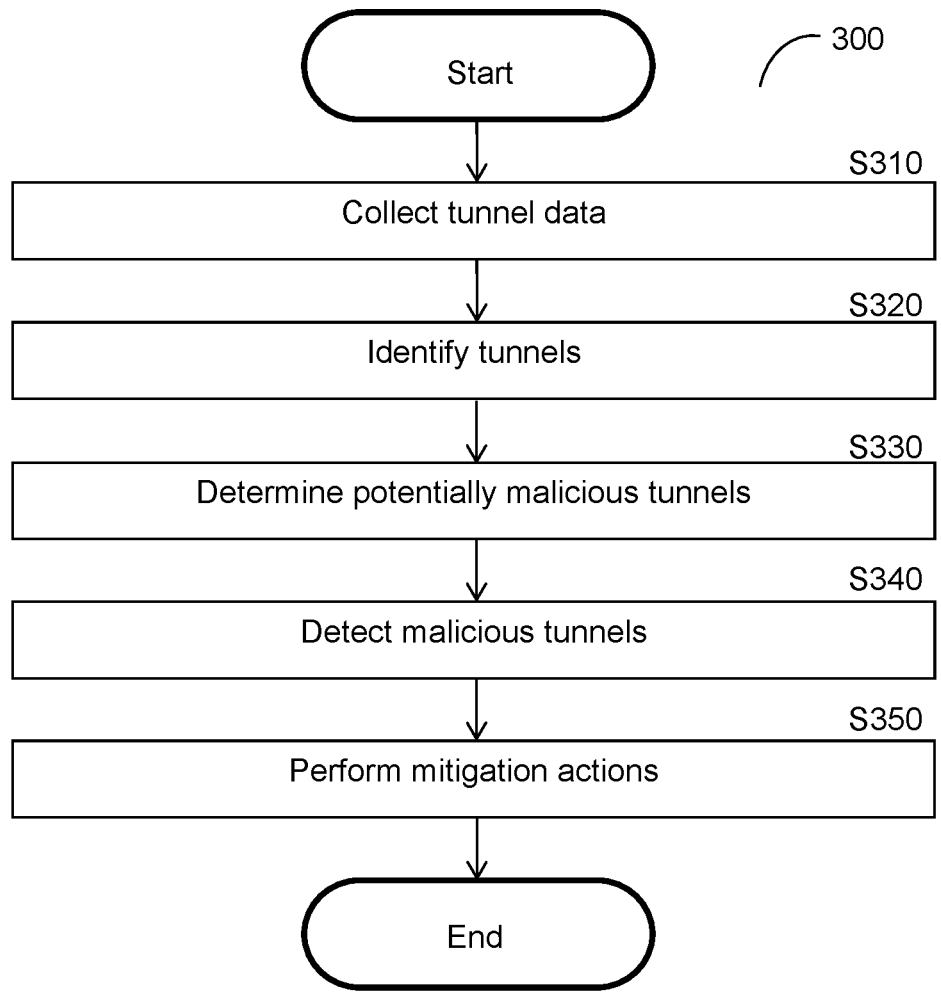
FIG. 3 is a flowchart illustrating a method for detecting malicious lateral movement using remote system protocols according to an embodiment.

FIG. 3 is a flowchart 300 illustrating a method for detecting malicious lateral movement using remote system protocols according to an embodiment. In an embodiment, the method is performed by the malicious lateral movement detector 130, FIG. 1.

At S310, tunnel data is collected. The tunnel data includes data indicating connections between devices which can therefore be used to identify tunnels formed through multiple such connections.

In some embodiments, the tunnel data is collected over two phases: a train phase, and a test phase that follows the train phase. As a non-limiting example, the train phase may occur during a period of 14 days in which remote desktop protocol (RDP) Internet protocol (IP) session tunnel data is collected and the test phase may occur during a period of 1 day in which RDP IP session tunnel data is collected which takes place after the 14 day period of the train phase. The data collected during the train phase may be used as points of comparison for determining statistical outliers, establishing tunnel classes, and the like.

At S320, tunnels are identified using the collected tunnel data. Each of the tunnels is identified with respect to connections between devices including at least two hops, where in each hop a packet is passed from one device to another. Each tunnel may include one or more simple tunnels each including two hops. Each tunnel is defined using multiple nodes and multiple edges. In an embodiment, each node represents a device, and each edge represents a connection between two nodes (i.e., between two devices).

At S330, potentially malicious tunnels among the identified tunnels are determined. In an embodiment, each potentially malicious tunnel includes one or more new edges, one or more outlier edges, or both. Each new edge is new as compared to a baseline. Each outlier edge is a statistical outlier as compared to tunnel data of a baseline tunnel data set. Such a baseline tunnel data set may include, for examples, tunnels represented in tunnel data of a train data set. An example method for determining potentially malicious tunnels is described further below with respect to FIG. 4.

At S340, malicious tunnels are detected from among the potentially malicious tunnels. In an embodiment, S340 includes classifying at least some of the potentially malicious tunnels into one or more isomorphic graph classes, and may further include analyzing a first edge of any potentially malicious tunnels classified into one of the classes as compared to first edges of a baseline tunnel data set. An example method for detecting malicious tunnels is described further below with respect to FIG. 5.

At optional S350, one or more mitigation actions are performed with respect to the detected malicious tunnels. The mitigation actions may include, but are not limited to, generating alerts, controlling connections between devices (e.g., severing connections in order to effectively remove tunnels), both, and the like. The alerts may be generated with respect to any detected malicious tunnels, and may further include risk levels determined as discussed further below.

Figure 4:
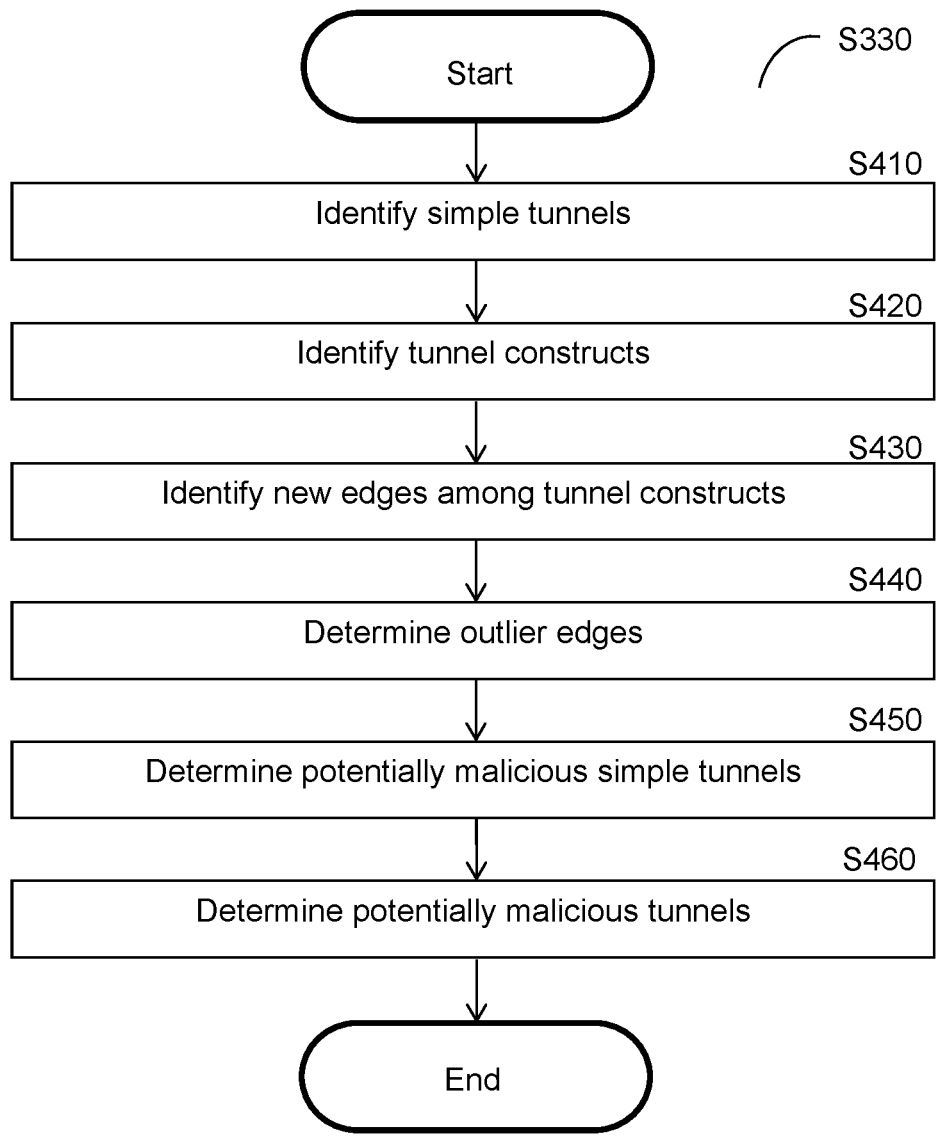
FIG. 4 is a flowchart illustrating a method for identifying potentially malicious tunnels according to an embodiment.

FIG. 4 is a flowchart S330 illustrating a method for identifying potentially malicious tunnels according to an embodiment.

At S410, simple tunnels are identified within tunnel data. In an embodiment, S410 includes applying simple tunnel identification rules which define criteria for identifying simply tunnels with respect to connections between devices and, more specifically, packets sent between devices included among the tunnel data. To this end, the tunnel data includes at least packets sent between devices. Further, in an embodiment, S410 may include analyzing the packets sent between devices in order to determine connection times, amount of data sent as traffic between devices, both, and the like.

A simple tunnel is defined with respect to at least 3 distinct devices A, B, and C. In an embodiment, a simple tunnel including devices A, B, and C is identified only if communications among devices A, B, and C meet the following criteria. A first criteria is that A connects to B and B connects to C. A second criteria is that connection time for a first hop (e.g., a hop including a connection between A and B) contains a connection time for a second hop (e.g., a hop including a connection between B and C). A third criteria is that an amount of bytes sent in the first hop (i.e., from A to B) contains the amount of bytes sent in the second hop (i.e., from B to C). A fourth criteria is that the traffic amount of bytes sent from B to A contains the amount of bytes sent from C to B. It should be noted that, in some implementations, only some of these criteria may be utilized for identifying simple tunnels (e.g., the first two criteria or the first three criteria).

The simple tunnels are atomic tunnel structures, with each simple tunnel containing two hops. As noted above, a hop is a level of communication in which a packet sent by one device is received by another device. A simple tunnel, also referred to as an atomic tunnel, has two hops such that packets traveling through that simple tunnel travel from a first device to a second device, and then from the second device to the third device. As discussed above with respect to FIG. 2B, each hop may include multiple potential starting and/or destination devices, for example, a destination device C1 and a destination device C2. A simple tunnel has two hops such that a packet traveling through the simple tunnel passes through 3 devices total (i.e., sent by a first device to a second device, then sent by a second device to a third device).

As noted above, in some embodiments, the tunnel data may be included in test and train sets. To this end, S410 may include identifying all simple tunnels in both the test and train sets.

At S420, tunnel constructs are identified. Each complex tunnel is a construct made up of one or more simple tunnels. By identifying all constructs including simple tunnels, all tunnels can be identified regardless of whether they are simple atomic structures or more complex structures including multiple atomic structures.

At S430, new edges among the tunnel constructs are identified. The edges are connections between devices included in the tunnel constructs, and new edges are connections between two devices for which a connection between the two devices was not previously observed (e.g., in previously analyzed tunnel data). For example, new edges may be edges that are observed in the test set but which were not observed in the train set. To this end, S430 may include identifying each edge in each tunnel identified in each of the train and test sets, and comparing between the identified edges to determine if any edges identified in the test set are not identified in the train set.

As a non-limiting example discussed with respect to FIGS. 2A and 2B, assume that remotely accessed device C 230 as depicted in FIG. 2A is the same device as remotely accessed device C1 230-1 depicted in FIG. 2B. The simple tunnel 200A including connections A→B and B→C1 is observed in the tunnel data of the train set. In the test set, the simple tunnel 200B including connections A→B, B→C1, and B→C2 is observed. The connection B→C2 is new as compared to the train set, and therefore an edge representing that connection is identified as a new edge.

At S440, outlier edges are determined. To this end, S440 includes statistically analyzing session data of one or more edges in order to determine whether they are outliers, for example, as compared to previously observed edges (e.g., edges in a train set). The statistical analysis may be performed with respect to session data such as, but not limited to, time of the beginning of a session for an edge (e.g., an hour in which such a session began), a total session duration of a session in which a packet is sent via the edge (e.g., an entire time of communicating among devices in a given tunnel including the edge), an amount of incoming data sent via the connection represented by the edge, and amount of outgoing data sent via the connection represented by the edge, a combination thereof, and the like. For a tunnel construct including only a single simple tunnel A→B→C, the session duration may include the amount of time in a session including communications A→B as well as B→C.

In an embodiment, S440 includes performing local outlier factor (LOF) detection, probability of multinormal distribution analysis, or both. In a further embodiment, LOF detection is performed when the connection appeared less than a threshold number of times previously (e.g., in all prior available data), and multinormal distribution analysis is performed when the connection appeared at least the threshold number of times previously. As a non-limiting example, LOF may be used when the connection appeared less than 30 times previously and multinormal distribution analysis may be used when the connection appeared 30 or more times previously.

In an embodiment, only tunnel constructs including new edges are analyzed for outlier edges. More specifically, any previously observed (i.e., not new) edges among a tunnel construct having one or more new edges may be analyzed to determine whether those previously observed edges are outliers. Analyzing only tunnel constructs with new edges for outlier edges allows for conserving computing resources as compared to analyzing all tunnel constructs for outlier edges. In this regard it is noted that edge is only likely to be considered an outlier if it is a new edge or otherwise included in a tunnel containing a new edge. Thus, in many implementations, it is not necessary to analyze tunnels lacking new edges for outlier edges.

At S450, potentially malicious simple tunnels are determined based on the new edges and the outlier edges. In an embodiment, each potentially malicious simple tunnel is one of the simple tunnels including an outlier edge. In a further embodiment, each potentially malicious tunnel is one of the simple tunnels for which each edge of the simple tunnel is a new edge or an outlier edge.

As a non-limiting example described with respect to the simple tunnel 200A depicted in FIG. 2A, if each of the edge between device A 210 with device B 220 and the edge between Device B 220 with device C 230 is a new edge or an outlier edge, then the simple tunnel 200A is determined to be a potentially malicious simple tunnel.

At S460, potentially malicious tunnels are determined based on the potentially malicious simple tunnels. In an embodiment, each potentially malicious tunnel is a tunnel construct including one or more potentially malicious simple tunnels.

Figure 5:
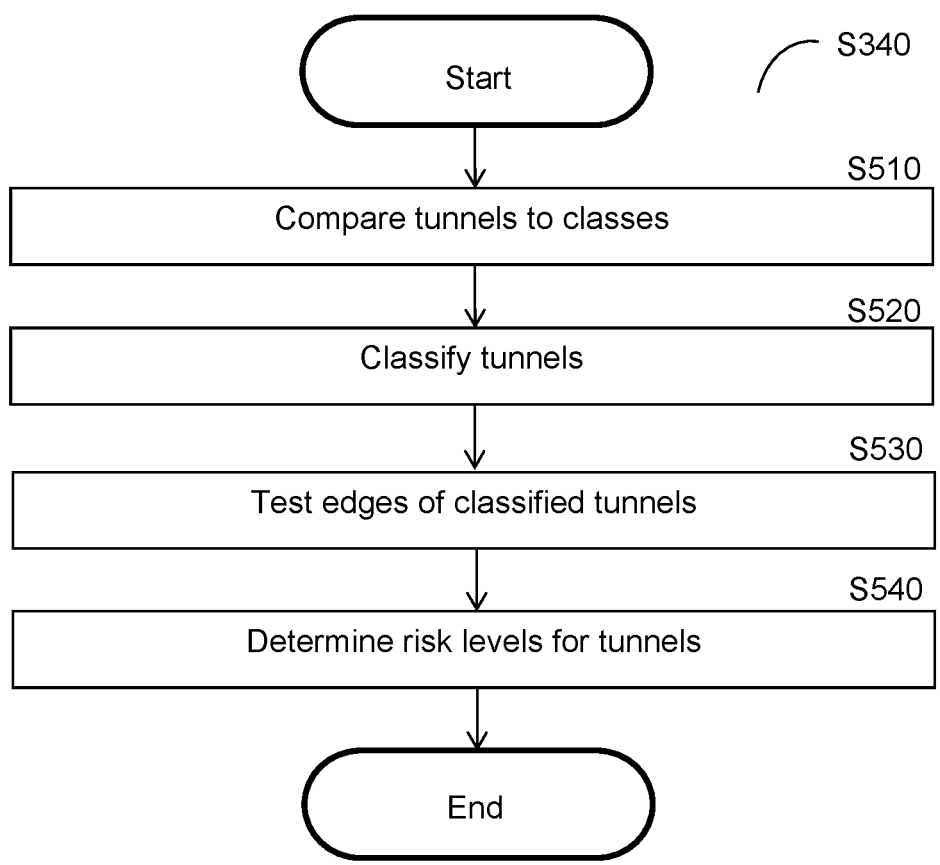
FIG. 5 is a flowchart illustrating a method for detecting malicious tunnels according to an embodiment.

FIG. 5 is a flowchart S340 illustrating a method for detecting malicious tunnels according to an embodiment.

At S510, tunnels are compared to tunnel classes. More specifically, a structure of each tunnel is compared to a structure associated with each tunnel class. The structure of a tunnel is defined with respect to nodes and edges, where each node represents a respective device and each edge represents a respective connection between two devices. Tunnels having the same structure have the same number of both edges and nodes, and further has the same number of edges per hop.

In an embodiment, the tunnel classes are defined using previously observed tunnels such as, but not limited to, tunnels included in the train set. Moreover, the tunnel classes are defined with respect to graph structure, i.e., a structure of the various connections between devices included among the tunnel. Such a graph structure characterizes the work style of the tunnel in a manner that allows for classifying tunnels with respect to work styles. Moreover, the graph structures serve as isomorphic graphs, thereby allowing for comparing tunnels isomorphically.

As a non-limiting example, for tunnels including only one simple tunnel, the structure depicted in FIG. 2A may be a first class of tunnel and the structure depicted in FIG. 2B may be a second class of tunnel. The simple tunnel 200A has three nodes and two edges, with one edge in each hop. The simple tunnel 200B has four nodes and three edges, with one edge in the first hop (A→B) and two edges in the second hop (B→C1 and B→C2).

At S520, the tunnels are classified based on the comparison. In an embodiment, each tunnel whose structure matches the structure associated with one of the tunnel classes is classified into that tunnel class. In a further embodiment, if none of the tunnel class structures match the structure of a given tunnel, the tunnel may be detected as malicious due to abnormality.

At S530, edges of the classified tunnels are tested. That is, for each tunnel that was successfully classified (and was not identified as unclassified), edges of that tunnel are analyzed. The results of the testing may be used, for example, in order to determine whether to generate an alert with respect to each tested tunnel, a risk level for each alert to be generated, both, and the like.

In an embodiment, for each classified tunnel including 3 or 4 nodes (i.e., 3 or 4 devices), a first edge of the tunnel is tested against all first edges of known tunnels having the same tunnel class in order to determine whether the tested first edge is an outlier as compared to the known first edges. The first edge is an edge among the first hop of the tunnel, i.e., an edge between the first device represented in the tunnel and the second device represented in the tunnel when the tunnel is arranged from origin of packets to potential destinations of packets (i.e., where final destinations are remotely accessed systems). As a non-limiting example, the first edge for the simple tunnel shown in FIG. 2A is the edge between device A 210 with device B 220. Whether the first edge is an outlier as compared to other first edges of tunnels in the same classification may be determined, for example, using one or more of the processes discussed above with respect to S440.

In this regard, it is noted that a tunnel having only 3 or 4 nodes representing connected devices has a relatively small number of connections such that only testing the first edge may be sufficient to accurately determine whether to generate an alert for that tunnel, i.e., if the first edge is an outlier for a tunnel having only 3 or 4 nodes, it has been identified that the tunnel presents enough risk to warrant generating an alert. The reason for this is that the work style of a tunnel including only 3 or 4 nodes is too common such that only having a few outliers may be enough to declare an alert, and the difference between the first edge (which is typically the most essential part of the work style for a given tunnel) and other first edges of previously observed tunnels of the same class is sufficient information to determine whether to declare an alert for a potentially malicious tunnel.

At S540, risk levels are determined for the tunnels based on the testing and identification of unclassified tunnels. In an embodiment, the risk level for each tunnel is determined based on a number of devices involved in the tunnel (e.g., a number of devices represented by nodes of the tunnel), a number of potentially malicious simple tunnels in the tunnel, or both. In a further embodiment, the risk level for each tunnel may be determined based on these numbers for the tunnel as compared to respective numbers of devices and/or potentially malicious simple tunnels for previously observed tunnels (e.g., tunnels in the train set). In an example implementation, the risk level may be determined as low, medium, or high for any tunnels for which alerts are to be generated.

Figure 6:
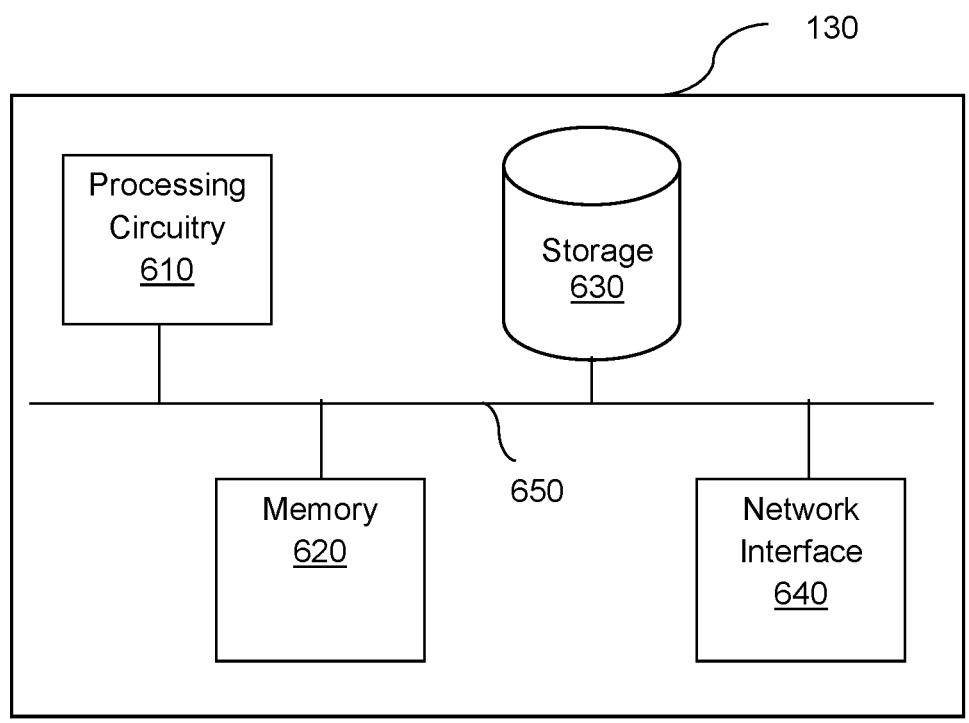
FIG. 6 is a schematic diagram of a malicious lateral movement detector according to an embodiment.

FIG. 6 is an example schematic diagram of a malicious lateral movement detector 130 according to an embodiment. The malicious lateral movement detector 130 includes a processing circuitry 610 coupled to a memory 620, a storage 630, and a network interface 640. In an embodiment, the components of the malicious lateral movement detector 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the malicious lateral movement detector 130 to communicate with, for example, the database 120, the accessing devices 140, the remotely accessed device, a combination thereof, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for malicious lateral movement detection, comprising:
identifying a plurality of atomic tunnels based on data including packets sent between devices among a plurality of devices, wherein each atomic tunnel is a structure representing communications among the plurality of devices defined with respect to at least three nodes and at least two edges, each node representing a respective device of the plurality of devices, each edge representing a connection between two of the plurality of devices, each atomic tunnel having two hops, wherein each hop is a level of communication in which a packet is sent from one device to another device, and wherein at least one device of the plurality of devices comprises a remotely accessed device accessed by one or more other devices of the plurality of devices using one or more remote system protocols;

identifying a plurality of tunnel constructs, wherein each tunnel construct is a structure including at least one of the plurality of atomic tunnels;

determining a potentially malicious atomic tunnel among the plurality of atomic tunnels by comparing the edges of each of the plurality of atomic tunnels to a plurality of edges of a plurality of previously observed tunnel constructs;

determining a potentially malicious tunnel, wherein the potentially malicious tunnel includes the potentially malicious atomic tunnel, and wherein determining the potentially malicious tunnel comprises:

performing a classification of the plurality of previously observed tunnel constructs to classify each previously observed tunnel construct into a class of a plurality of classes, wherein each class comprises an associated structure;

isomorphically comparing a tunnel structure of the potentially malicious atomic tunnel to the associated structure of each class of the plurality of classes; and matching the tunnel structure with one of the associated structures to determine the potentially malicious tunnel; and performing at least one mitigation action based on the determined potentially malicious tunnel.

2. The method of claim 1, wherein the potentially malicious atomic tunnel is one of the plurality of atomic tunnels for which at least one of the at least two edges of the potentially malicious atomic tunnel is an outlier edge as compared to the edges of the plurality of previously observed tunnel constructs.

3. The method of claim 2, further comprising:

analyzing session data for the edges of at least one tunnel construct of the plurality of tunnel constructs in order to determine whether each edge of the analyzed at least one tunnel construct is an outlier edge as compared to the edges of the plurality of previously observed tunnel constructs.

4. The method of claim 3, wherein the analyzed session data includes at least one of: time of beginning of session, total session duration, amount of incoming data, and amount of outgoing data.

5. The method of claim 2, wherein each edge of the potentially malicious atomic tunnel is either a new edge or an outlier edge as compared to the edges of the plurality of previously observed tunnel constructs, wherein a new edge is an edge that was not included among the plurality of previously observed tunnel constructs.

6. The method of claim 1, further comprising:

comparing a structure of the potentially malicious tunnel construct to a structure associated with each of a plurality of tunnel classes in order to determine a classification for the potentially malicious tunnel, wherein each of the plurality of tunnel classes is defined based on a respective portion of the plurality of previously observed tunnel constructs;

testing a first edge of the potentially malicious tunnel construct in order to determine whether the tested first edge is an outlier edge as compared to a first edge of each of at least one matching class tunnel construct of the plurality of previously observed tunnel constructs, wherein each of the at least one matching class tunnel construct has a same classification as the potentially malicious tunnel construct; and detecting the potentially malicious tunnel as a malicious tunnel when the tested first edge is an outlier edge as compared to the first edge of each of the at least one matching class tunnel construct.

7. The method of claim 1, wherein, for each atomic tunnel, a connection time of a first hop of the atomic tunnel includes a connection time of a second hop of the atomic tunnel.

8. The method of claim 1, wherein, for each atomic tunnel, an amount of data sent in a first hop of the atomic tunnel includes an amount of data sent in a second hop of the atomic tunnel.

9. The method of claim 1, wherein performing the at least one mitigation action includes generating an alert including a risk level, wherein the risk level is determined based on at least one of: a number of devices represented by the nodes of the potentially malicious tunnel, and a number of potentially malicious atomic tunnels included in the potentially malicious tunnel.

10. A non-transitory computer readable medium having stored thereon instructions for causing a processing circuitry to execute a process, the process comprising:

identifying a plurality of atomic tunnels based on data including packets sent between devices among a plurality of devices, wherein each atomic tunnel is a structure representing communications among the plurality of devices defined with respect to at least three nodes and at least two edges, each node representing a respective device of the plurality of devices, each edge representing a connection between two of the plurality of devices, each atomic tunnel having two hops, wherein each hop is a level of communication in which a packet is sent from one device to another device, and wherein at least one device of the plurality of devices comprises a remotely accessed device accessed by one or more other devices of the plurality of devices using one or more remote system protocols;

identifying a plurality of tunnel constructs, wherein each tunnel construct is a structure including at least one of the plurality of atomic tunnels;

determining a potentially malicious atomic tunnel among the plurality of atomic tunnels by comparing the edges of each of the plurality of atomic tunnels to a plurality of edges of a plurality of previously observed tunnel constructs;

determining a potentially malicious tunnel, wherein the potentially malicious tunnel includes the potentially malicious atomic tunnel, and wherein determining the potentially malicious tunnel comprises:

performing a classification of the plurality of previously observed tunnel constructs to classify each previously observed tunnel construct into a class of a plurality of classes, wherein each class comprises an associated structure;

isomorphically comparing a tunnel structure of the potentially malicious atomic tunnel to the associated structure of each class of the plurality of classes; and matching the tunnel structure with one of the associated structures to determine the potentially malicious tunnel; and performing at least one mitigation action based on the determined potentially malicious tunnel.

11. A system for malicious lateral movement detection, comprising:
a processing circuitry; and
a memory, the memory containing instructions that, when executed by the processing circuitry, configure the system to:
identify a plurality of atomic tunnels based on data including packets sent between devices among a plurality of devices, wherein each atomic tunnel is a structure representing communications among the plurality of devices defined with respect to at least three nodes and at least two edges, each node representing a respective device of the plurality of devices, each edge representing a connection between two of the plurality of devices, each atomic tunnel having two hops, wherein each hop is a level of communication in which a packet is sent from one device to another device, and wherein at least one device of the plurality of devices comprises a remotely accessed device accessed by one or more other devices of the plurality of devices using one or more remote system protocols;
identify a plurality of tunnel constructs, wherein each tunnel construct is a structure including at least one of the plurality of atomic tunnels;
determine a potentially malicious atomic tunnel among the plurality of atomic tunnels by comparing the edges of each of the plurality of atomic tunnels to a plurality of edges of a plurality of previously observed tunnel constructs;
determine a potentially malicious tunnel, wherein the potentially malicious tunnel includes the potentially malicious atomic tunnel, and wherein determining the potentially malicious tunnel comprises:
performing a classification of the plurality of previously observed tunnel constructs to classify each previously observed tunnel construct into a class of a plurality of classes, wherein each class comprises an associated structure;
isomorphically comparing a tunnel structure of the potentially malicious atomic tunnel to the associated structure of each class of the plurality of classes; and
matching the tunnel structure with one of the associated structures to determine the potentially malicious tunnel; and
perform at least one mitigation action based on the determined potentially malicious tunnel.

12. The system of claim 11, wherein the potentially malicious atomic tunnel is one of the plurality of atomic tunnels for which at least one of the at least two edges of the potentially malicious atomic tunnel is an outlier edge as compared to the edges of the plurality of previously observed tunnel constructs.

13. The system of claim 12, wherein the system is further configured to:
analyze session data for the edges of at least one tunnel construct of the plurality of tunnel constructs in order to determine whether each edge of the analyzed at least one tunnel construct is an outlier edge as compared to the edges of the plurality of previously observed tunnel constructs.

14. The system of claim 13, wherein the analyzed session data includes at least one of: time of beginning of session, total session duration, amount of incoming data, and amount of outgoing data.

15. The system of claim 12, wherein each edge of the potentially malicious atomic tunnel is either a new edge or an outlier edge as compared to the edges of the plurality of previously observed tunnel constructs, wherein a new edge is an edge that was not included among the plurality of previously observed tunnel constructs.

16. The system of claim 11, wherein the system is further configured to:
compare a structure of the potentially malicious tunnel construct to a structure associated with each of a plurality of tunnel classes in order to determine a classification for the potentially malicious tunnel, wherein each of the plurality of tunnel classes is defined based on a respective portion of the plurality of previously observed tunnel constructs;
test a first edge of the potentially malicious tunnel construct in order to determine whether the tested first edge is an outlier edge as compared to a first edge of each of at least one matching class tunnel construct of the plurality of previously observed tunnel constructs, wherein each of the at least one matching class tunnel construct has a same classification as the potentially malicious tunnel construct; and
detect the potentially malicious tunnel as a malicious tunnel when the tested first edge is an outlier edge as compared to the first edge of each of the at least one matching class tunnel construct.

17. The system of claim 11, wherein, for each atomic tunnel, a connection time of a first hop of the atomic tunnel includes a connection time of a second hop of the atomic tunnel.

18. The system of claim 11, wherein, for each atomic tunnel, an amount of data sent in a first hop of the atomic tunnel includes an amount of data sent in a second hop of the atomic tunnel.

19. The system of claim 11, wherein performing the at least one mitigation action includes generating an alert including a risk level, wherein the risk level is determined based on at least one of: a number of devices represented by the nodes of the potentially malicious tunnel, and a number of potentially malicious atomic tunnels included in the potentially malicious tunnel.

* * * * *